United States Patent Office 3,322,668
Patented May 30, 1967

3,322,668
DRILLING FLUIDS AND ADDITIVE THEREFOR
Ison G. Fontenot and Ernest F. Snyder, Lafayette, La., assignors to International Minerals & Chemical Corporation, a corporation of New York
No Drawing. Filed Oct. 22, 1962, Ser. No. 232,285
1 Claim. (Cl. 252—8.5)

This invention relates to drilling fluids and more particularly to an improved, fragmented asphaltic additive therefor.

In the drilling of wells for oil and gas by the rotary method, a circulated fluid is used to cool and lubricate the bit, to remove cuttings as they are dislodged by the bit, and to maintain all subterranean formations and the fluids therein in statu quo during the drilling operation. The latter function is accomplished by the superior hydrostatic pressure exerted by the drilling fluid or "mud." The technology of rotary drilling using such a circulating fluid is so well known that those skilled in the art do not need a more detailed general description of the functions and operations involved. However, it is to be noted that in the course of drilling a well by this method, the drilling fluid or mud is called upon to perform diverse functions simultaneously, and it is not always easy or indeed possible to tailor the mud and maintain it in proper condition, so that all of the functions desired may be performed satisfactorily.

One of the characteristics of a good drilling fluid is that it possesses the ability to resist filtration. This is indeed necessary if the mud is to remain in an uncased bore hole in contact with permeable formations under conditions wherein hydrostatic pressure is exerted against the formation walls, as is indeed the usual and normal case. Modern rotary drilling would indeed be impossible if a considerable measure of infiltrability were not possible in current technology.

The drilling fluids or muds (the terms are used synonomously herein) most generally used may be divided into two broad categories, viz., water base and oil base. In a water base mud, water is the continuous, liquid phase of the fluid, whereas in an oil base, the continuous, liquid phase is oil, generally a petroleum oil. Oil base muds may be either water-free, or may have some water, indeed as much as 60% by volume, although generally considerably less, present in the form of a dispersed discontinuous phase, i.e., in an emulsified state. Water base muds, by the same token, may be oil-free, or in some cases they may have some oil, generally a minor fraction by volume, emulsified therein in the form of minute droplets of emulsified oil.

The present invention is concerned chiefly with water base muds, and indeed with a common type of water base mud in which clays including bentonites are used to impart desired rheological characteristics and in part to increase the density of the mud. Weighting agents of wel-known types, such as ground barite, may also be present as well as any of a host of other additives commonly used in this mud for reducing filtrability, changing the flow characteristics and the like.

In the ordinary course of use of drilling muds, a certain amount of filter cake is formed on exposed strat by a filtration process which involves migration of the fluid phase of the mud into the formation with a corresponding deposit of a sludge or cake containing the solids of the mud. In the final analysis, what regulates this type of filtration and the degree to which it takes place is the permeability of the filter cake or sludge deposit. There are thus two aspects to the problem of achieving and maintaining mud infiltrability, which are not always clearly recognized by those engaged in this branch of chemical technology. The first is that of producing a fluid or mud which has good infiltrability in the first place; and the second aspect of the problem is the provision of a mud which lays down a thin filter cake or sludge which retains its low permeability and thus its ability to resist invasion of fluids for an indefinite period of time, even under drastic conditions of high temperature and high pressure. Many of the stratagems employed to achieve good infiltrability are successful only at low temperatures or may be initially successful at high temperatures but do not give a permanently infiltrable filter cake.

It is an object of the present invention to provide a means of imparting good infiltrability properties to water base drilling muds.

Another object of the invention is to provide a means of enhancing the additives of known infiltrability additives for water base drilling muds.

Another object of the invention is to provide an improved method of using blown asphalt in connection with drilling muds.

Other objects of the invention will appear as the discussion thereof proceeds.

Generally speaking, and in accordance with an illustrative embodiment of our invention, we prepare an initial mixture of air-blown asphalt and minor amounts of a light petroleum hydrocarbon insoluble, aromatic hydrocarbon solvent soluble resinous extract of pine wood and of an alkali, such as calcium hydroxide, sodium hydroxide or potassium hydroxide. We prepare this by heating the air-blown asphalt to slightly above its melting point and then stirring in the resin and the alkali, so that the alkali soap of the resin, together with excess alkali, is actually dissolved or at least colloidally dispersed in the bulk mass of the asphalt itself. After insuring that the ingredients are thoroughly blended so as to form a homogeneous product, we then allow the melt to cool and solidify. Following this, we grind the asphalt-resin soap mixture, using, for example, a hammer mill so as to produce a fragmented asphalt of very small particle size, preferably 90% passing 100 U.S. standard mesh or indeed even finer. In the operation of our invention in its drilling fluid aspect we incorporate an effective amount of the fragmented asphalt product just described into the mud. The amounts found to be effective for the inventive purpose are in general from about 1 lb. per barrel to 25 lbs. per barrel, although it will be understood that under extreme conditions of drilling, both of these limits may be exceeded and some of the advantages of the invention yet retained.

The air-blown asphalt which we use may be any of those commonly produced and available in the United States, as discussed below. Air-blown asphalt, as is known, is produced by heating a suitable petroleum stock with the simultaneous incorporation of air, so that oxygen is taken up by the asphalt and its softening point is raised to a relatively high value. We prefer an air-blown asphalt having a ring and ball softening point of about 278° F., as determined by the applicable ASTM standards. However, a wide range of air-blown asphalts is usable in accordance with our invention, and we may use those having softening points within the general range 240° F. to 340° F. Air-blown asphalts having a softening point of about 280° F. or higher are sometimes known as "mineral rubbers," and as appears from the foregoing, these are included within the usable range of asphalts.

The substantially petroleum hydrocarbon insoluble, aromatic hydrocarbon solvent soluble resinous pine wood extract which we use is a well-known article of commerce in the United States and is widely known under an applicable registered trademark, viz., "Vinsol." Its manufacture is described in U.S. Patent No. 2,193,026; the manufacture is likewise summarized in U.S. Patent No. 2,606,884, entitled: "Adhesive Comprising Vinsol and a Butadiene-Acrylonitrile Synthetic Rubber." The disclosures of both of these patents are incorporated herein by reference. Indeed, since the art has widely adopted the term "Vinsol" for the substantially petroleum hydrocarbon insoluble, aromatic hydrocarbon solvent soluble resinous pine wood extract, as evidenced for example by its entry as "Vinsol" in the subject indexes of "Chemical Abstracts" and in the text of numerous U.S. patent specifications, we shall occasionally use it herein for simplification.

Vinsol resin has something of the nature of a rosin acid, and may be neutralized with an alkali to form a soap. This is indeed a common procedure in many usages of Vinsol resin, for example, in making emulsions of various types. In order to neutralize Vinsol resin, approximately 11 lbs. of sodium hydroxide, 15½ lbs. of potassium hydroxide, or 10 lbs. of calcium hydroxide are required. Our inventive procedure is characterized by the use of a many-fold excess of alkali over and above that required to neutralize, i.e., to saponify the Vinsol resin. We use at least a three-fold excess, which thus amounts to at least about 35 lbs. of calcium hydroxide or sodium hydroxide and 45 lbs. of potassium hydroxide per 100 lbs. of Vinsol resin. This is, however, the lower limit and we even prefer to have several times as much alkali present as Vinsol resin. Thus, for example, we have found best the use of 750 lbs. of calcium hydroxide in the form of slaked lime for each 100 lbs. of Vinsol resin. However, we do not use within the limits of the present invention more than 1500 lbs. of alkali, such as slaked lime, for each 100 lbs. of Vinsol resin, for otherwise the beneficial effects of the resin tend to be diluted too much by the considerable excess of alkali.

We have found that from about 1% to about 4% of Vinsol resin in the total weight of asphalt, resin and alkali gives good results for our inventive purpose and more particularly, we find best the use of about 2% by weight. Thus, the composition that we find best is the following:

*Example 1*

| | Lbs. |
|---|---|
| Vinsol resin | 2 |
| Slaked lime | 15 |
| Air-blown asphalt 278° F. softening point | 83 |
| | 100 |

The ingredients are mixed together with the asphalt in a molten state, mixing being continuous until the mass is homogeneous to the eye, whereupon it is allowed to cool to room temperature in a hammer mill so that 90% passes 100 mesh.

The process of the invention may also be carried out by substituting variously sodium hydroxide or potassium hydroxide for the slaked lime or indeed by using approximately equal mixtures of all three alkalis or of any two. However, while these various alternative formulations give good results, they do not give the best results, which as already mentioned, are obtained by following Example 1 hereinabove.

To summarize, our inventive compositions of matter consist essentially of from about one part to about four parts, about two parts being best, of Vinsol resin; a quantity of calcium hydroxide from about 0.3 part to 15 parts, about 7½ parts being best, or the stoichiometric equivalent of sodium hydroxide or potassium hydroxide or mixtures of any two or three of the just named hydroxides, for each one part of said resin; and the balance air-blown asphalt having a ring and ball softening point within the range of 240° F. to 340° F., best being about 278° F., in a quantity sufficient to make 100 parts by weight of total composition.

In order to use the asphalt-resin-alkali product just described, in accordance with a further aspect of our invention, we add the fragmented, viz., powdered or comminuted product to the drilling mud, adding it in the same fashion that clays or weighting materials or chemicals generally are added. Thus, a cone and jet mixer of the well-known type common in oil field practice may be used. For the initial treatment of a mud in accordance with our invention we add as little as 1 lb. of the product per barrel (42 U.S. gallons) of mud to as much as 25 lbs. per barrel. The amounts most commonly used fall within the range of 5 to 15 lbs. per barrel. As drilling continues, we continue to add the product to the mud so as to maintain its infiltrability within the limits found desirable or necessary for drilling in the particular area concerned.

We are not certain of all of the reasons underlying the superior performance obtained in accordance with our invention, but we may state some tentative conclusions, without, however, wanting to be bound thereby, since the system concerned is quite complex, both from a physical and chemical standpoint. It appears that the addition of the Vinsol resin and the excess of alkali imparts a most unusual set of characteristics in the resulting mixture, evident particularly in the finely fragmented or comminuted form, already described. The Vinsol resin and the excess of alkali appears to have a plasticizing effect on the solid mix resulting, at the same time raising instead of lowering the softening point of the resulting product. This is quite unexpected and in exactly the opposite direction from what would result if one simply chose an asphalt which has been more completely air-blown. In the latter case, the softening point would indeed be raised, but at the same time, the particles would be more brittle and less able to conform to whatever shape is required under high pressure compression of a filter cake. At the same time, the surface characteristics of the fragmented particles are changed, very markedly in the direction of a more water compatible surface, as a result of the "built-in" resin soap thus incorporated. This is quite different from merely adding an emulsifying or surface active agent to the mud system itself, because in that case one still has to deal with an air-blown asphalt surface. When proceeding in accordance with the invention, the characteristics of the modified asphalt particles are changed in the mass, so that our fragmented particles are compatible when added to a mud system even without a special treament of the mud itself in an attempt to make it more compatible with asphalt surfaces. The compatibility thus achieved makes for self-dispersing properties as far as the fragmented particles are concerned, and they do not have the tendency to clump together in flocculated aggregates, with consequent high filtrability.

Further results of the compatibility of surface characteristics are the freedom from floating and the freedom from "greasing" which is observed when asphalt in accordance with our invention is used in drilling muds. If an attempt is made to use ordinary ground blown asphalt, even in the presence of large amounts of chemical drilling agents, which may include surfactants and other thinners, to the mud itself, the asphalt particles exhibit a strong tendency to adhere to minute bubbles of air and gas which may be present in the mud. This causes the particles to rise to the surface, by a mechanism not unlike that involved in the well known flotation process of ore beneficiation.

For much the same basic reason, if small amounts of oil are introduced into the water-base mud which has been treated with ordinary ground air-blown asphalt not in accordance with the present invention, then the asphalt particles tend to coalesce with the oil phase and form clots or aggregates of slushy and pasty mixtures of asphalt and oil. This again is most undesirable and nullifies the effect of the addition of the asphalt.

In contrast, when asphalt which has been made in accordance with our invention is used, there is encountered neither flotation nor "greasing," which we believe is explainable by the drastic modification throughout the mass of each individual particle of asphalt in its water compatibility characteristics.

It will be seen that the invention accomplishes its objects. It will also be apparent that while our invention has been described with the aid and in terms of various specific components, conditions, considerations and the like, numerous variations in detail are permissible within the broad scope of the invention, as defined by the claim which follows.

Having described our invention, we claim:

The process of preparing a drilling mud additive which comprises: heating an air-blown asphalt having a softening point in the general range of 240° F. to 340° F. to a temperature higher than its melting point; incorporating therein a minor proportion of substantially petroleum hydrocarbon insoluble, aromatic hydrocarbon solvent soluble resinous pine wood extract, and a minor amount of an alkali chosen from the group consisting of calicum hydroxide, sodium hydroxide, potassium hydroxide, and mixtures thereof; said resinous pine extract comprising between about 1% and 4% of the total weight of the composition, said alkali being present in an amount of between 0.3 to 15 parts for each part by weight of said pine wood extract, computed stoichiometrically as calcium hydroxide; agitating the mixture so formed until it is homogeneous; thereafter cooling said mixture until it solidifies; and thereafter fragmenting said solidified mixture into particles such that 90% pass 100 mesh.

References Cited

UNITED STATES PATENTS

| | | | |
|---|---|---|---|
| 2,033,509 | 3/1936 | Bowie | 252—8.5 |
| 2,119,732 | 6/1938 | Beckwith et al. | 252—311.5 |
| 2,256,886 | 9/1941 | Buckley | 252—311.5 |
| 2,370,911 | 3/1945 | Mayfield | 252—311.5 |
| 2,380,156 | 7/1945 | Dobson et al. | 252—8.5 |
| 2,431,891 | 12/1947 | Rosencranse | 252—311.5 |
| 2,475,485 | 7/1949 | Dyke et al. | 252—8.5 |
| 2,481,374 | 9/1949 | Watts et al. | 252—311.5 |
| 2,498,301 | 2/1950 | Self | 252—8.5 |
| 2,557,647 | 6/1951 | Gates et al. | 22—8.5 |
| 2,773,670 | 12/1956 | Miller | 252—8.5 |

FOREIGN PATENTS 476,310   8/1951   Canada.

LEON D. ROSDOL, *Primary Examiner.*

JULIUS GREENWALD, *Examiner.*

H. B. GUYNN, *Assistant Examiner.*